Feb. 7, 1939.    J. S. BARNES    2,146,245
HEAT EXCHANGE APPARATUS
Filed Aug. 19, 1936    2 Sheets-Sheet 2
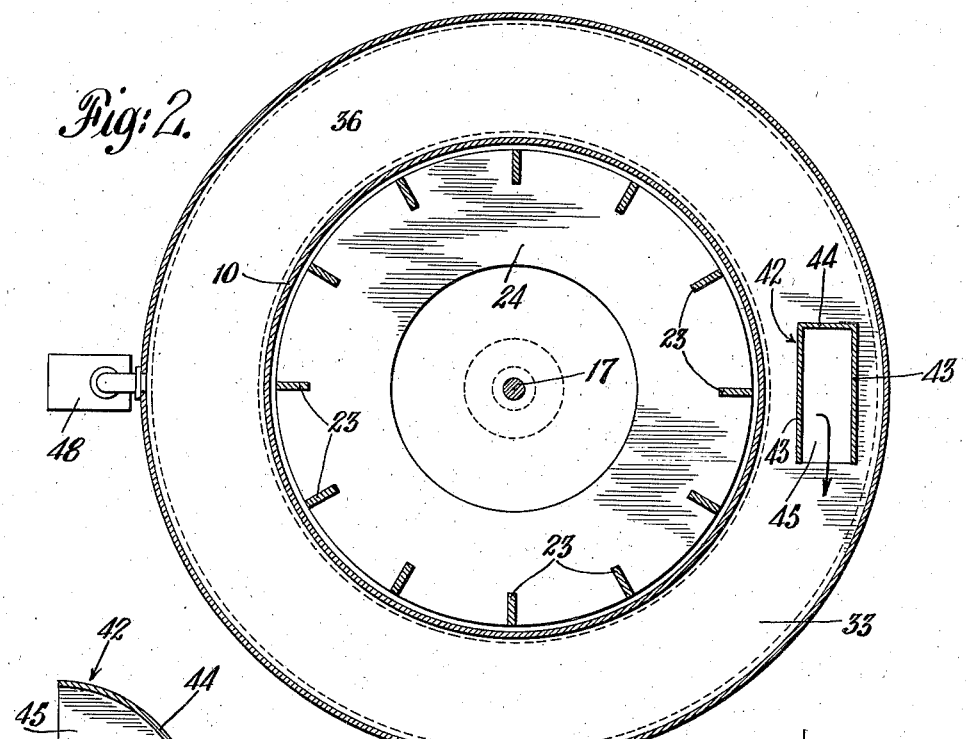
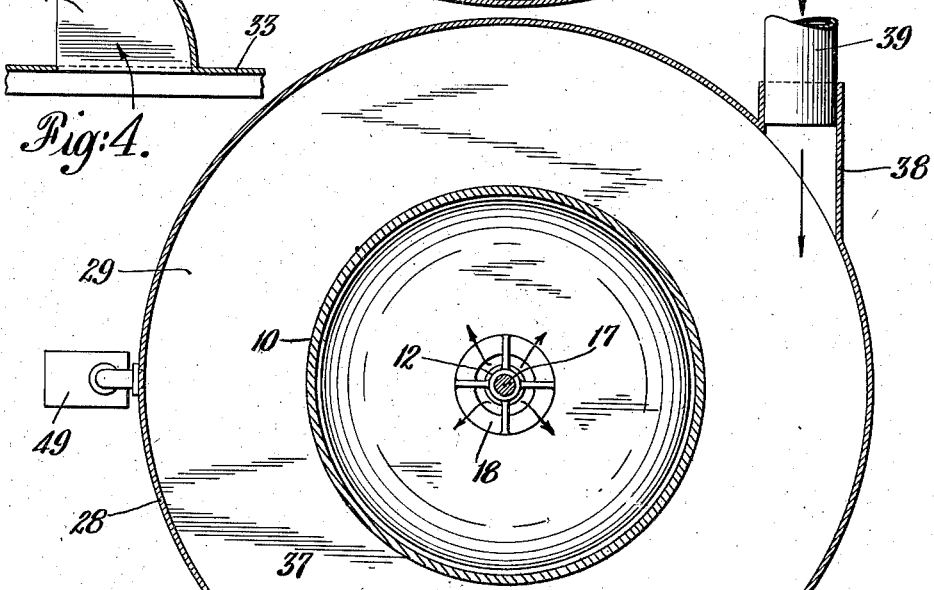
INVENTOR
JOHN S. BARNES
BY
ATTORNEY Patented Feb. 7, 1939

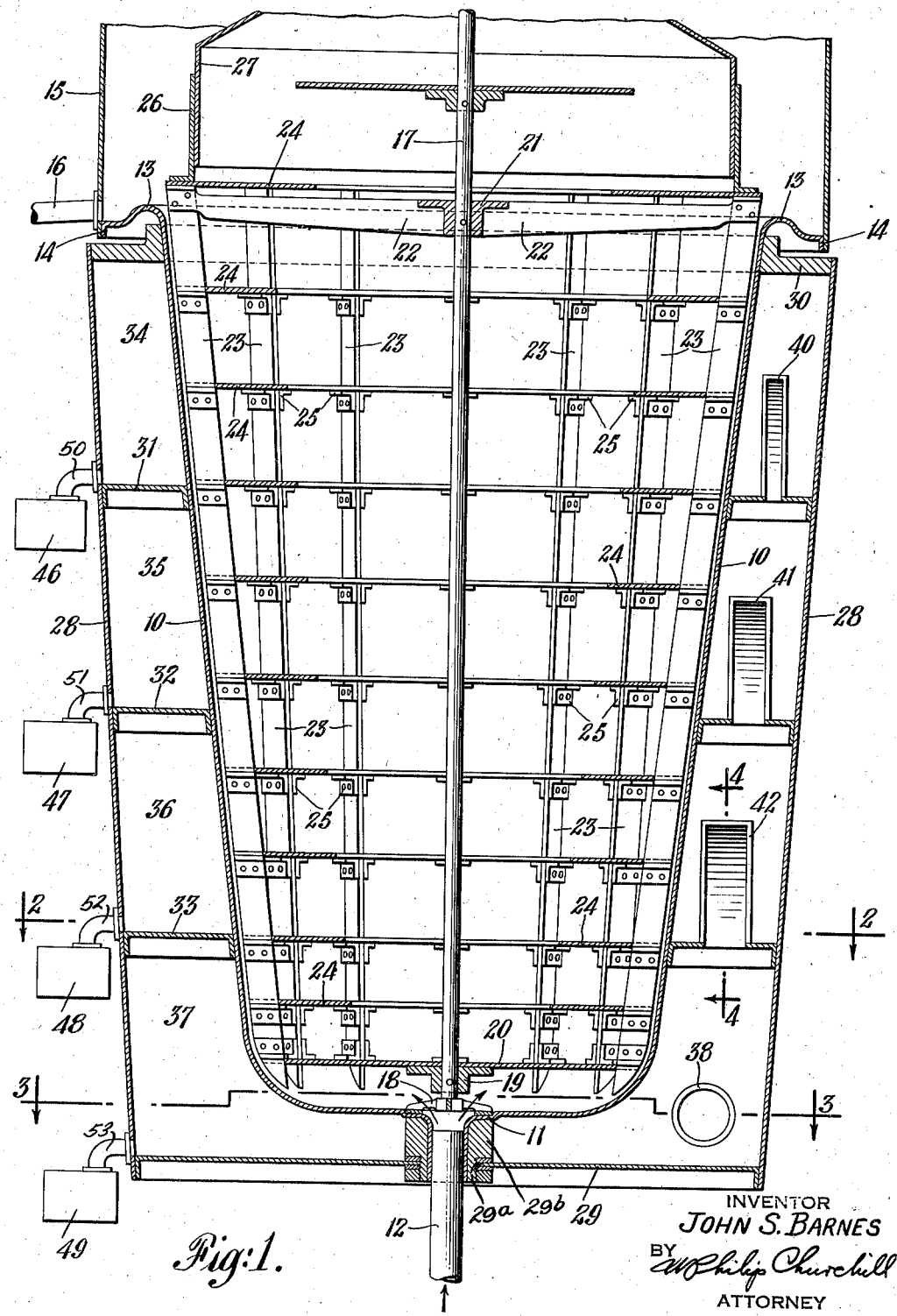

2,146,245

UNITED STATES PATENT OFFICE

2,146,245

HEAT EXCHANGE APPARATUS

John S. Barnes, White Plains, N. Y., assignor to The Borden Company, New York, N. Y., a corporation of New Jersey Application August 19, 1936, Serial No. 96,746

6 Claims. (Cl. 257—109)

This invention relates to apparatus for effecting the transfer of heat from one medium to another and is more particularly directed to apparatus for rapidly transferring heat from an expansible heating medium to a liquid.

In the heat exchange art, the use of jackets containing a heating medium are in common use. Frequently the heating medium comprises a vaporized liquid such as steam and is introduced to the jacket under a considerable pressure and velocity. The velocity of the medium, however, rapidly diminishes and as the heating medium loses its heat and condenses, the condensate collects on the surface which is to be heated, or through which the heat is to be transferred, thus forming a liquid film. These films tend to cut down very substantially the rate of heat transfer and in fact act as heat insulating films.

Various arrangements have been tried with some degree of success for avoiding or reducing these insulating films. Drip plates have been provided to collect and carry away this liquid as it forms, but such drip plates while helpful are only partially successful. Condensation of this character could be reduced, if desired, by providing an outlet for the heating medium discharging the partially spent medium directly to the atmosphere from a remote portion of the jacket. Such a heat exchange system, however, is very wasteful since the discharged medium carries away a large portion of its initial heat.

An object of my invention is to overcome these disadvantages and to provide apparatus and method for efficiently exchanging heat from one medium to another.

A further object of my invention is to increase the velocity of a heating medium from time to time in a heating jacket without exhausting the medium to the atmosphere.

A further object of my invention is to control and provide apparatus for controlling the velocity, pressure and temperature of a gaseous heating medium in a jacket.

Another object of my invention is to provide a heating jacket divided into a plurality of zones to more effectively control the travel of the heating medium.

Further objects and advantages of this invention will be explained and will become apparent from the following description of one embodiment thereof illustrated in the drawings in which Figure 1 is a vertical section through the center of the lower portion of a milk evaporating device embodying my invention. Figure 2 is a horizontal section taken on the line 2—2 of Figure 1. Figure 3 is a horizontal section taken on the offset line 3—3 of Figure 1, and Figure 4 is a detailed sectional view of one of the ports taken on the line 4—4 of Figure 1.

The specific embodiment of my invention illustrated in the drawings shows a heating jacket of a preferred type applied to the heating section of a milk evaporating apparatus of a type shown in the patent to Irving S. Merrell No. 1,356,082. In this apparatus the inner or milk container is made up of side walls 10 arranged at an appropriate angle of the vertical and converging at the bottom to form an opening 11. An inlet pipe 12 communicates with this opening 11 and may be secured to the milk chamber walls in any desirable manner, such as by welding, soldering, or the like. The upper portion of the walls 10 are provided with edges which are rolled outwardly and downwardly to form a ridge 13, and provided with a depending flange 14 joined to the cylindrical shell 15. A channel is thus formed between the shell 15 and the ridge 13 arranged to collect milk flowing up out of the evaporating chamber, and the condensed product collected in this channel may be drawn off through an outlet pipe 16.

As the cold milk flows into the milk chamber through the inlet 12, it is rapidly whirled or subjected to centrifugal force in order to provide an upwardly flowing film of milk on the inner side of the walls 10. This whirling, or "beating" of the milk, as it is called, may be accomplished by a mechanism including the shaft 17 which is rotated from above by any suitable power means (not shown). The lower end of shaft 17 is journaled in a bracket 18 which is fitted in the opening 11 and shaped in the form of a spider to allow room for the passage of milk. A collar 19 is fixed to the shaft 17 just above the bracket 18 and supports a disc 20. A similar collar 21 is provided near the top of the shaft 17 and carries a plurality of arms 22 fixed to vertically and radially extending beater arms 23. A number of discs 24, having relatively large central openings for the passage of vapors, are attached to the beater arms 23 at intervals spaced vertically from each other, in order to lend rigidity to the rotating or beating apparatus. The beater arms 23 and discs 24 may be connected together by means of suitable brackets 25 of angle iron shape either riveted, bolted or otherwise attached to the beater arms 23 and discs 24.

The cylindrical section of sheet metal 26 is attached to the upper disc 24 and is arranged to cooperate with the hood member 27 to prevent the return of condensed vapor into the channel containing the thickened milk. The upper portion of the apparatus may be suitably connected to means for condensing the vapor and/or vacuum producing means (not shown).

My invention relates principally to the heating of the walls 10 by a gaseous medium under pressure. The heating jacket which surrounds the walls 10 may be made up of an outer substantially cylindrical shell 28, a lower disc-like base member 29, and an annular casting 30 connected together and to the walls 10. Base member 29 is provided with a central opening 29a and is fixed to the spacing member 29b which surrounds the milk inlet. This heating jacket is preferably divided into a plurality of zones 34 to 37 by means of annular partition members 31, 32 and 33. These partition members may be provided with flanges suitable for attaching to the cylinder 28 and the walls 10 in any suitable manner. The several zones 34 to 37, inclusive, are thus separate and independent from each other. The heating medium under pressure, such as steam, may be introduced to the lower zone 37, through a suitable pipe 39, connected to inlet 38. In order to provide for thorough circulation of heating medium, I prefer to introduce the vapors tangentially of the heating jacket thus giving a rotary motion to the heating medium. Just above the inlet 38 are provided a series of ports 40, 41 and 42 in the partitions 31, 32 and 33, respectively. These ports may each be of substantially rectangular horizontal cross section, as illustrated in Figure 2, and made up of side walls 43 and an upper wall 44 curved to form an arc of about 90°. Suitable openings in the partitions communicate with these ports and the ports are preferably open at one end as at 45 and arranged to direct the heating medium circumferentially of their respective zones. Each of the zones 34—37 is connected to one of the steam traps 46—49, as by pipes 50—53, for withdrawing condensed moisture from the several zones.

The operation of the apparatus illustrated is as follows:

A gaseous heating medium, such as steam, is introduced through the port 38 and flows around the lower zone 37 with a whirling motion. As this steam arrives under the port 42, it seeks to escape to the zone 36 which is at a lower pressure. As the steam passes through the port 42, its velocity is again increased with an accompanying pressure drop, and the steam is propelled through the mouth of port 42 and around the zone 36. In like manner steam from zone 36 passes through the port 41 and steam from zone 35 passes through the port 40 and around the zone 34. Each of these zones thus contains heating medium at a different pressure, with the medium contained in each succeeding zone at a correspondingly reduced pressure. By reason of the transfer of heat from the steam to the liquid to be evaporated, considerable portions of the steam condense in each zone and the pressure thus never has an opportunity to become equalized in all of the zones. As long as this pressure differential is maintained, it may be readily employed to increase the velocity of medium coming into each zone and thereby increase the heat transferring effect. The increased velocity of the heating medium tends to sweep or blow off any condensate adhering to the walls 10 and a much more direct transfer of heat is thereby obtained through the walls 10 to the film of milk with a resulting increase in the rate of heat transfer. Individual condensate outlets are desirable because of the different pressures obtaining in the different zones.

In order to provide for a substantial drop in pressure, ports 42, 41 and 40 are preferably made of successively smaller cross sectional area. By suitably adjusting the relative sizes of these ports, the increase in the rate of heat exchange may be varied to some extent. As applied to the evaporation of milk, where the cold milk is flowing in at the bottom of the container as through the inlet 12, I prefer to maintain the lowest zone 37 at the highest temperature and this is accomplished by introducing heating medium to this zone 37 at the highest temperature and under the highest pressure. The temperature of the different zones will correspond roughly to their pressures and thus the thickened condensed milk as it approaches the ridge 13 is subjected to the lowest temperature and runs less risk of becoming burned. It will thus be seen that my invention provides for the accurate control of temperature, pressure, and velocity of an expansible heating medium.

Many modifications in my invention will be apparent to those skilled in the art. For example, the jacket may comprise a spiral or helical duct with vertical partitions dividing this duct into a plurality of zones and openings in these partitions of the correct size to allow restricted passage of the heating medium. The ports do not necessarily have to be positioned to direct heating medium tangentially of the milk chamber but may if desired be faced to direct the medium directly against the wall 10. The ports may also be arranged in staggered relationship instead of directly over each other, although the arrangement illustrated is preferred since it obtains a complete circulation of the steam in each zone. Although illustrated as applied to a cylindrical jacket, the heating jacket and zones may be of oval or any other desirable size or shape. I have discovered that the use of partitions and zones greatly increases the rapidity of heat transfer even compared with the improved jacket illustrated in the above mentioned Merrell patent. The use of zones in accordance with my invention results in a 38% increase in the rapidity of heat transfer to the milk when applied to this apparatus. In other words, with a heating jacket in accordance with my invention, an average of roughly 38% more milk can be evaporated per hour with an attendant increase in efficiency.

While my invention has been described in connection with a milk evaporator and finds special utility in this use, it will be clear that the principles thereof may be readily applied to condensing any other liquid or to heating any other material.

The terms and expressions which I have employed are used as terms of description and not of limitation, and I have no intention, in the use of such terms and expressions, of excluding any equivalents of features shown and described or portions thereof, but recognize that various modifications are possible within the scope of the invention claimed.

I claim:

1. Apparatus of the character described comprising a container of substantially circular cross-section for material to be heated, a jacket divided into a plurality of substantially annular chambers surrounding said container, means for introducing a condensible gaseous heating medium under pressure into one of said chambers substantially tangentially to a surface of said container in a direction to flow around said chamber, and means for passing said medium from said first chamber into another chamber at an increased velocity and substantially tangentially to the surface of said container in a direction to flow around said other chamber.

2. In apparatus for heating a liquid, a container, means for passing a film of said liquid over a wall of said container, a plurality of chambers in juxtaposition to said wall and separated thereby from said liquid, means for introducing a condensible gaseous heating medium under pressure into the chamber nearest the inlet of said liquid, and means for passing said medium into an adjacent chamber and simultaneously increasing the velocity thereof.

3. Apparatus of the character described comprising a container, an inlet for liquid near one end of said container, means for flowing a film of said liquid over the inner surface of said container, a heating jacket divided into a plurality of compartments surrounding said container, means for introducing an expansible heating medium into the compartment nearest said inlet, and means for passing said medium into an adjacent compartment and simultaneously increasing the velocity thereof.

4. Liquid evaporating apparatus comprising a container of substantially circular cross-section, an inlet for liquid near the bottom thereof, means for flowing a sheet of said liquid upward over the inner surface of the container, a jacket divided into a plurality of substantially annular chambers surrounding said container, means for introducing a condensible gaseous heating medium under pressure into the lowermost chamber, and a port for passing said medium to the next higher chamber and simultaneously increasing the velocity thereof.

5. Apparatus for heating milk comprising a substantially vertical container having an inlet and outlet and providing for continuous passage of milk therethrough, a heating jacket surrounding said container in heat exchanging relation therewith, substantially horizontal partitions dividing said jacket into a plurality of individual chambers disposed adjacent each other along the path followed by milk passing through said containers, ports of sufficiently small cross-sectional area connecting said chambers in series to substantially increase the velocity of steam passed therethrough, and means for introducing steam under pressure into the chamber nearest the milk inlet for said container, the chamber furthest removed from said introducing means being constructed and arranged to prevent the free escape of steam therefrom.

6. Apparatus for heating milk comprising a container having an inlet and outlet and providing for continuous passage of milk therethrough, a heating jacket surrounding said container in heat exchanging relation therewith, partitions dividing said jacket into a plurality of individual chambers disposed adjacent each other along the path followed by milk passing through said container, ports of sufficiently small cross-sectional area connecting said chambers in series to substantially increase the velocity of steam passed therethrough, and means for introducing steam under pressure into the chamber nearest the milk inlet for said container, the chamber furthest removed from said introducing means being constructed and arranged to prevent the free escape of steam therefrom, and the cross-sectional area of the connecting ports diminishing in size from the chamber in which steam is introduced to the chamber furthest removed therefrom.

JOHN S. BARNES.